United States Patent
Parker

(10) Patent No.: US 10,601,844 B2
(45) Date of Patent: Mar. 24, 2020

(54) NON-RULE BASED SECURITY RISK DETECTION

(71) Applicant: Guavus, Inc., San Mateo, CA (US)

(72) Inventor: Benjamin James Parker, Reno, NV (US)

(73) Assignee: GUAVUS, INC., San Jose, CA (US)

( * ) Notice: Subject to any disclaimer, the term of this patent is extended or adjusted under 35 U.S.C. 154(b) by 0 days.

(21) Appl. No.: 15/650,809

(22) Filed: Jul. 14, 2017

(65) Prior Publication Data
US 2019/0020667 A1    Jan. 17, 2019

(51) Int. Cl.
H04L 29/06 (2006.01)
(52) U.S. Cl.
CPC ...... H04L 63/1416 (2013.01); H04L 63/0272 (2013.01); H04L 63/107 (2013.01); H04L 63/145 (2013.01); H04L 63/1425 (2013.01)
(58) Field of Classification Search
CPC ............ H04L 63/1416; H04L 63/1425; H04L 63/0272; H04L 63/145
See application file for complete search history.

(56) References Cited

U.S. PATENT DOCUMENTS

| | | | | |
|---|---|---|---|---|
| 7,114,183 | B1* | 9/2006 | Joiner | H04L 43/045 713/188 |
| 2013/0305357 | A1* | 11/2013 | Ayyagari | H04W 12/06 726/22 |
| 2015/0319185 | A1* | 11/2015 | Kirti | H04L 63/1416 726/23 |
| 2017/0102978 | A1* | 4/2017 | Pallath | G06F 11/0709 |

* cited by examiner

Primary Examiner — Baotran N To
(74) Attorney, Agent, or Firm — Kerr IP Group, LLC

(57) ABSTRACT

A non-rule based security detection system and method is described. The method includes identifying a plurality of data sources. The method then proceeds to generate a baseline for each data source. The baseline includes a plurality of data source outputs that are evaluated over a time period. A plurality of data source anomalies are detected, in which each data source anomaly is associated with at least one data source output exceeding a threshold for the data source baseline. A geolocation for each data source anomaly is then identified. A plurality of correlations between the plurality of data source anomalies and the geolocation for each data source anomaly are generated. At least one correlation is associated with a security event.

21 Claims, 13 Drawing Sheets

Security Analytics — 244

ALERTS

| | Investigate | Clear |
|---|---|---|
| Inside Network Port Scan<br>Source: WS-Rastogi | ☒ | ○ |
| Malware Detected<br>Source: WS-Parker | ☐ | ○ |
| Malware Blocked<br>Source: IDS1 | ☐ | ○ |
| Multiple Failed Login Attempts<br>Source: VPN-185.72.178.227 | ☐ | ○ |
| Simultaneous Login<br>Source: WS-Parker | ☐ | ○ |

TOP BLOCKLIST EVENTS — 240

| Source | Site/Domain | # of Events | Investigate | Clear |
|---|---|---|---|---|
| WS-Rastogi | www.diaryofagmaeaddict.com | 6,768 | ☐ | ○ |
| IDS3 | 78.31.65.216 | 4,768 | ☐ | ○ |
| WS-Lakhina | www.datageek.com | 2,323 | ☐ | ○ |

TOP SOURCE IP AND DOMAINS — 232

| IP | Geography | Protocol | Domain | # of Events | Investigate | Clear |
|---|---|---|---|---|---|---|
| 193.252.148.70 | France | HTTP | Orange.fr | 90,000,768 | ☐ | ○ |
| 74.125.30.94 | USA | HTTP | Gmail.fr | 60,000,163 | ☐ | ○ |
| 209.15.13.134 | Canada | HTTP | Badguy.com | 12,000,076 | ☐ | ○ |

TOP FIREWALL EVENTS — 242

| Firewall | Action-Rule | # of Events | Investigate | Clear |
|---|---|---|---|---|
| FW1-192.168.1.1 | Accept -33 | 200,000,768 | ☐ | ○ |
| FW7-192.116.1.1 | Accept -33 | 60,000,768 | ☐ | ○ |
| FW13-192.115.1.1 | Accept -32 | 55,000,076 | ☐ | ○ |

TOP USERS — 236

| Username | Geography | Outlier Domain | # of Events | Investigate | Clear |
|---|---|---|---|---|---|
| Lakhina | USA | kissarmy.com | 24,987 | ☐ | ○ |
| Pierre | France | hackerhunter.com | 18,125 | ☐ | ○ |
| Parker | USA | box.net | 500 | ☐ | ○ |

TOP MALWARE EVENTS — 234

| IDS | Action-Rule | IP Address | # of Events | Size | Investigate | Clear |
|---|---|---|---|---|---|---|
| IDS1-192.168.1.3 | Reject -33 | 81.177.139.111 | 200,000,768 | 5MB | ☐ | ○ |
| FW7-192.116.1.3 | Reject -33 | 62.219.67.44 | 60,000,768 | 100MB | ☐ | ○ |
| FW13-192.115.1.3 | Reject -32 | 5.200.55.58 | 55,000,076 | 25GB | ☐ | ○ |

TOP EMAIL USERS — 238

| Username | Geography | Outlier Domain | # of Events | Size | Investigate | Clear |
|---|---|---|---|---|---|---|
| Lakhina | USA | mail.ISIS.com | 22,000 | 5MB | ☐ | ○ |
| Pierre | France | guavus.com | 18,125 | 125kB | ☐ | ○ |
| Parker | USA | thales.com | 500 | 650kB | ☐ | ○ |

NON-RULE BASED SECURITY RISK DETECTION

FIELD

The presently disclosed subject matter relates to cyber security analytics systems and methods. More specifically, a non-rule based security detection system and method that detects cyber security events is described.

BACKGROUND

The rise of computing and mobile devices has been accompanied by a rise in malicious software or malware (e.g., computer viruses, ransomware, worms, trojan horses, spyware, adware), information and identity theft, snooping, eavesdropping, and other unsavory acts. Thus, there is a need to develop improved systems and techniques for monitoring computing device activity, quickly and accurately identifying threats, and responding accordingly.

Intrusion detection systems (IDS) have been developed to detect unauthorized use of information and resources and to help uncover attempts to gain access to computer networks and the information stored therein. There are two complementary approaches to detecting intrusions, namely, knowledge-based approaches and behavior-based approaches.

Knowledge-based intrusion detection techniques compare captured data to information regarding existing techniques to exploit vulnerabilities. An alarm is triggered when a match is detected.

Behavior-based intrusion detection techniques attempt to spot intrusions by observing deviations from normal or expected behaviors of the system or the users. An alarm is generated when a suspected deviation is observed. Traditional security systems use rules to correlate events and these rules may be used to analyze and correlate user and events to identify intrusions.

The systems and methods described herein provide non-rule based correlation system and method that improves on the rules-based correlation developed by traditional security systems.

SUMMARY

A non-rule based security detection method is described. The method includes identifying a plurality of data sources. The method then proceeds to generate a baseline for each data source. The baseline includes a plurality of data source outputs that are evaluated over a time period. A plurality of data source anomalies are detected, in which each data source anomaly is associated with at least one data source output exceeding a threshold for the data source baseline. A geolocation for each data source anomaly is then identified. A plurality of correlations between the plurality of data source anomalies and the geolocation for each data source anomaly are generated. At least one correlation is associated with a security event.

In one illustrative embodiment, the non-rule security detection method receives a trouble ticket, and associates the trouble ticket with at least one security event.

In another illustrative embodiment, the non-rule security detection method performs a flow analysis, in which a data source baseline is established for at least one data source. The non-rule security detection method then generates an alert when there are changes to the data source baseline.

In yet another illustrative embodiment, the non-rule security detection includes performing a malware analysis, in which an alert is detected that identifies an executable file. The malware analysis continues by identifying an IP address for each computing device attempting to launch the executable file and correlating a plurality of received emails with the computing device attempting to launch the executable file.

In still another illustrative embodiment, the non-rule security detection method includes performing a Virtual Private Network (VPN) analysis, in which a VPN connection baseline is established for a plurality of computing devices. The VPN analysis includes identifying an IP address for each computing device and determining a geolocation for each IP address. The VPN analysis continues by identifying a failed login attempt based on the geolocation of the computing device that attempted the failed login, and generating an alert when the failed login attempt based on the geolocation of the computing device is inconsistent with the VPN connection baseline.

In an even further illustrative embodiment, the non-rule security detection method includes performing an account validation, in which an anomalous account validation data flow is detected over the time period. The account validation continues by correlating at least one of an administrator login activity and a privileged user login activity with the anomalous account validation data flow.

In a still further illustrative embodiment, the non-rule security detection method performs an email analysis, in which an email baseline is determined. The email analysis continues by generating an email alert when an email address operates inconsistently with an email baseline.

An illustrative non-rule security detection system is described. The non-rule security detection system includes a database and a sub-system. The database receives data from a plurality of data sources. The sub-system generates a baseline for each data source. The baseline includes a plurality of data source outputs that are evaluated over a time period. The sub-system is also configured to detect a plurality of data source anomalies, in which each data source anomaly is associated with at least one data source output exceeding a threshold for the data source baseline. The sub-system identifies a geolocation for each data source anomaly. Additionally, the sub-system generates a plurality of correlations with the plurality of data source anomalies and the geolocation for each data source anomaly. The sub-system associates at least one correlation with a security event. The non-rule security detection system receives trouble tickets, performs flow analysis, malware analysis, VPN analysis, account validation and email analysis.

Another illustrative non-rule security detection system is also described. A non-rule based security detection system that includes a database, a timeline module, a geolocation module and a correlation module is described. The database receives data from a plurality of data sources. The timeline module generates a baseline for each data source. The baseline includes a plurality of data source outputs that are evaluated over a time period. The timeline module detects a plurality of data source anomalies, in which each data source anomaly is associated with at least one data source output exceeding a threshold for the data source baseline. The geolocation module identifies a geolocation for each data source anomaly. The correlation module generate a plurality of correlations with the plurality of data source anomalies and the geolocation for each data source anomaly. The correlation module associates at least one correlation with a security event.

DRAWINGS

The presently disclosed subject matter will be more fully understood by reference to the following drawings, which are provided for illustrative purposes only, and not for limiting purposes.

FIG. 6C shows an illustrative dashboard.

DESCRIPTION

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the systems and methods described herein may vary as to configuration and as to details. Additionally, the methods may vary as to details, order of the actions, or other variations without departing from the illustrative methods disclosed herein.

The security detection system and method described herein utilizes non-rule based correlations to overcome the limitations of traditional security systems that apply rules to correlate events and these rules. The non-rule based security detection system and method provides full context, which enables rapid resolution of incidents. Additionally, the systems and methods described herein provide full threat context and reduce the time to detect malicious content and behaviors. Furthermore, the systems and methods provide information needed to formulate and institute a mitigation plan.

In general, the non-rule based security detection system and method presented herein can analyze a plurality of data sources simultaneously. A baseline is generated for each data source and these baselines are analyzed for anomaly detection purposes. A geolocation is associated with each anomaly. A correlation is established between the data source anomalies and the geolocation for each data source anomaly. The correlation is then associated with a security event.

The non-rule based security risk detection system and method utilizes continuous baselining, automated correlations, geolocation and anomaly detection to identify security risks. In the illustrative embodiment, a variety of data sources are combined and then used to identify critical relationships, which further presents how a security event may have occurred. Automated correlations are used to discover cause and effect relationships and to discover root causes. Details such as who, what, why and how are associated with the security event.

From an analytics perspective, the non-rule security detection system and method provides insights into what should be done to stop or remediate the security event. Additionally, the non-rule security detection system and method presented herein possesses the artificial intelligence to support the automation of actions that remediate security risks so that the systems and method are self-learning and continue to improve over time.

Figure 1:
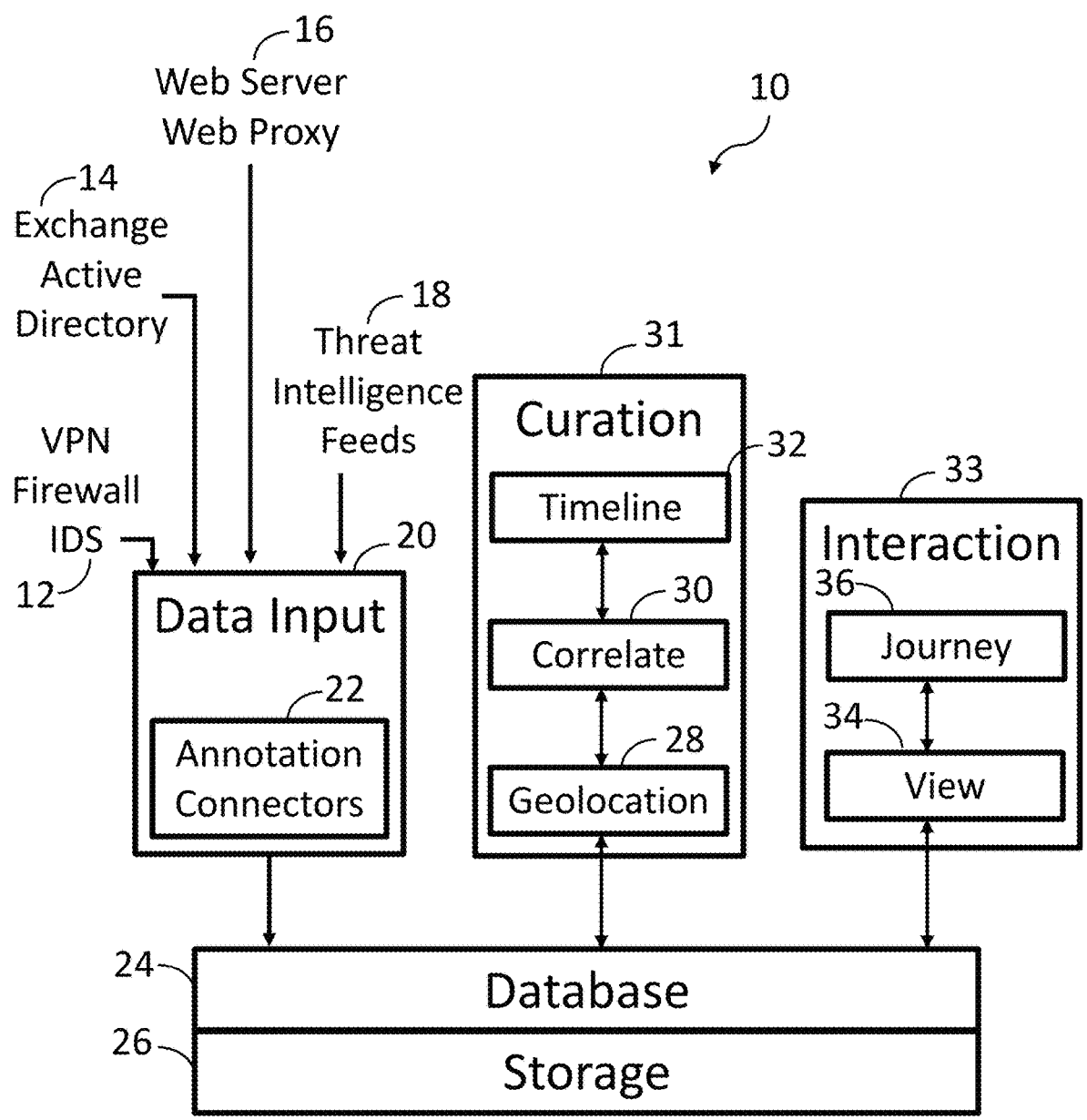
FIG. 1 shows a variety of data sources that are processed by an illustrative system architecture for a non-rule security detection system and method.

Referring to FIG. 1, there is shown a variety of data sources that are processed by an illustrative system architecture for a non-rule based security detection system and method. In operation, the illustrative system architecture 10 gathers information from a variety of different data sources such as router and switch logs, CASB, end point security logs, SNMP, Syslog and NetFlow and other such data sources.

FIG. 1 shows that the illustrative data sources include a security data sources 12, which includes a Virtual Private Network (VPN), a firewall and an Intrusion Detection System (IDS). The security data sources 12 are received by the data input module 20, which prepares the data for being received by the database 24. More specifically, the data input module includes an annotations and connectors module 22, which may add annotations to the received data set. Annotations are added to the received data set. Additionally, "connectors" may also be added, which import or export data from some of the most commonly used data systems. Connectors are one of the features or capabilities associated with KAFKA, which is a distributed streaming platform.

Additionally, the illustrative data sources may include e-mail and directory data sources 14 such as Microsoft Exchange and Microsoft Active Directory. Other illustrative data sources include web based data sources 16 such as a Web Server and a Web Proxy. Yet another illustrative data source includes threat intelligence feeds 18.

Threat intelligence is organized, analyzed and refined information about potential or current attacks that threaten an organization. The primary purpose of threat intelligence is helping organizations understand the risks of the most common and severe external threats. Although threat actors also include internal and partner threats, the emphasis is on the types that are most likely to affect a particular organization's environment. Threat intelligence includes in-depth information about specific threats to help an organization protect itself from the types of attacks that could do them the most damage.

Threat intelligence feeds are constantly updating streams of indicators or artifacts derived from a source outside the organization. The real-time nature of threat intelligence feeds is important because when integrated with threat intelligence platforms or security information and event management (SIEM) platforms it enables the automatic comparison of feed entries with internal telemetry such as firewall and DNS logs to identify potential attacks.

The illustrative data sources 12, 14, 16 and 18 operate as data inputs 20 to the non-rule security based detection system and method presented herein. The data inputs are then annotated accordingly at the annotations and connectors software module 22. An illustrative SQL database 24 receives the annotated data inputs 22 with connectors, which is then stored in an illustrative storage component 26, such as Apache Parquet. Apache Parquet is a columnar storage format.

The non-rule based security detection system and method then proceed to a curation component 31 that correlates, logs and determines the geolocation of the annotated data streams stored in the database 24. The non-rule based security detection system 10 may also include a timeline module 32, which generates logs for the illustrative annotated data inputs. A baseline is generated for each data source. The baseline includes a plurality of data source outputs that are evaluated over a time period. A plurality of data source anomalies are detected, in which each data source anomaly is associated with at least one data source output exceeding a threshold for the data source baseline. Anomalous data flow is detected by establishing a baseline, monitoring activity in relation to the baseline over a time period, and then identifying a threshold that exceeds the baseline activity over a certain period of time, i.e. logging.

The curation component 31 may also include a correlation module 30. The correlation module 30 generates correlations to identify complex relationships. The correlations may be triggered by anomalous data flows, which correlate features and determine relationships. Additionally, the correlation rules may be based on the data source that are ingested and correlations may be triggered by detected anomalies. Correlation results may be maintained for 12 months. By way of example and not limitation, correlations may be based on data related to the illustrative data inputs, namely, IP address, port, username, workstation name, server name, email size (attachment), blocklist hits, malware alerts, new or never before seen flows.

By way of example and not of limitation, a geolocation module 28 continues the process of associating data inputs with a geolocation. By way of example and not of limitation, the geolocation module 28 may use IP addressing as a basis for determining the geolocation of particular data inputs.

The results from the curation component 31 are then stored in the illustrative database 24 and in illustrative storage component 26. In another illustrative embodiment (not shown), the curated data stream generated by the curation component may be stored in another database such as an Apache HBase, which a distributed, scalable, Hadoop database.

An interaction component 33 may then process the curated data stream from the database 24. The interaction component 33 includes a view module 34 and a journey module 36. The view module 34 may presents the curated data stream in a tabular format as shown in FIG. 6C, which is described in further detail below.

Figure 6A:
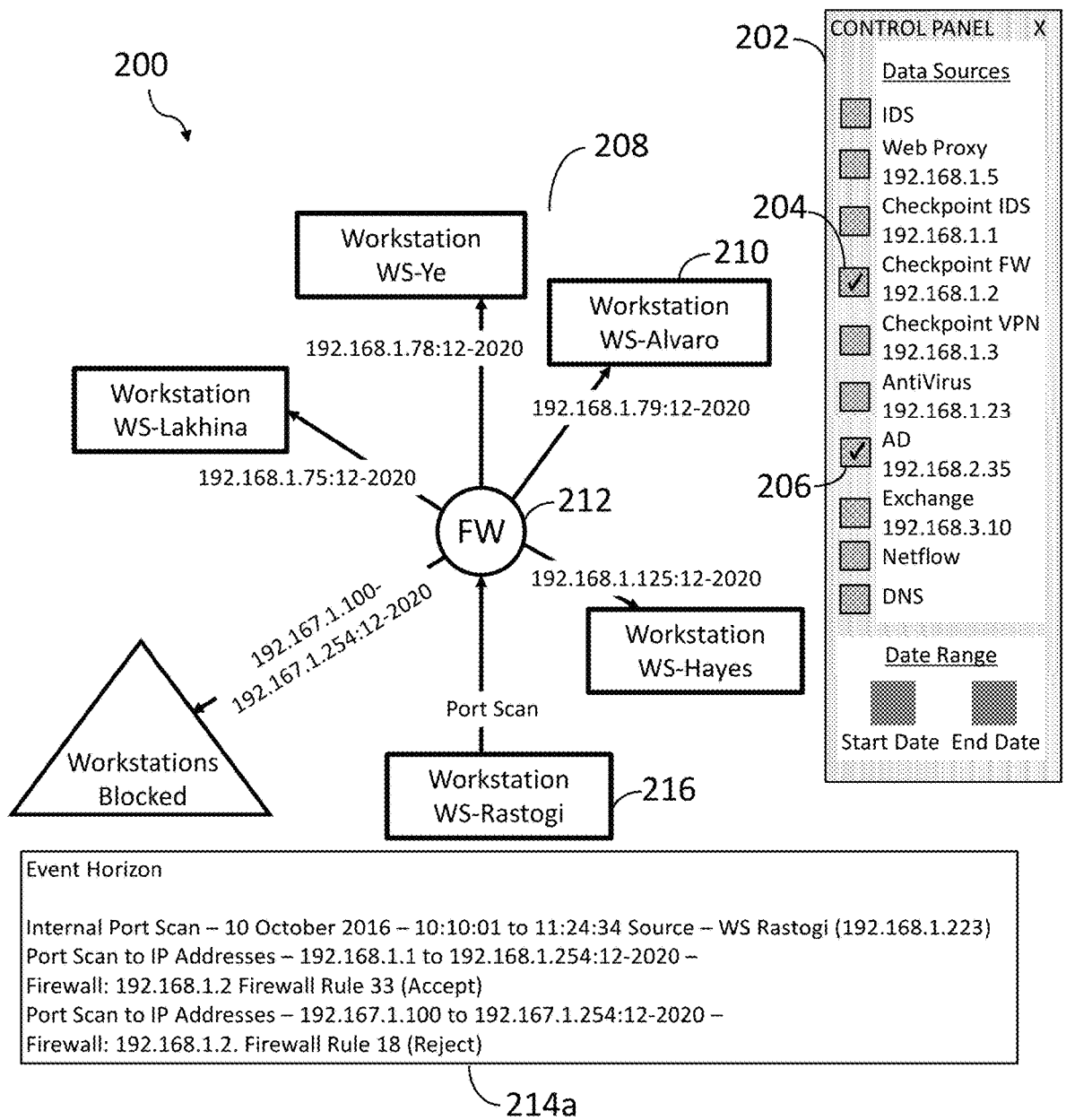
FIG. 6A shows an illustrative network graph that includes a control panel.
Figure 6B:
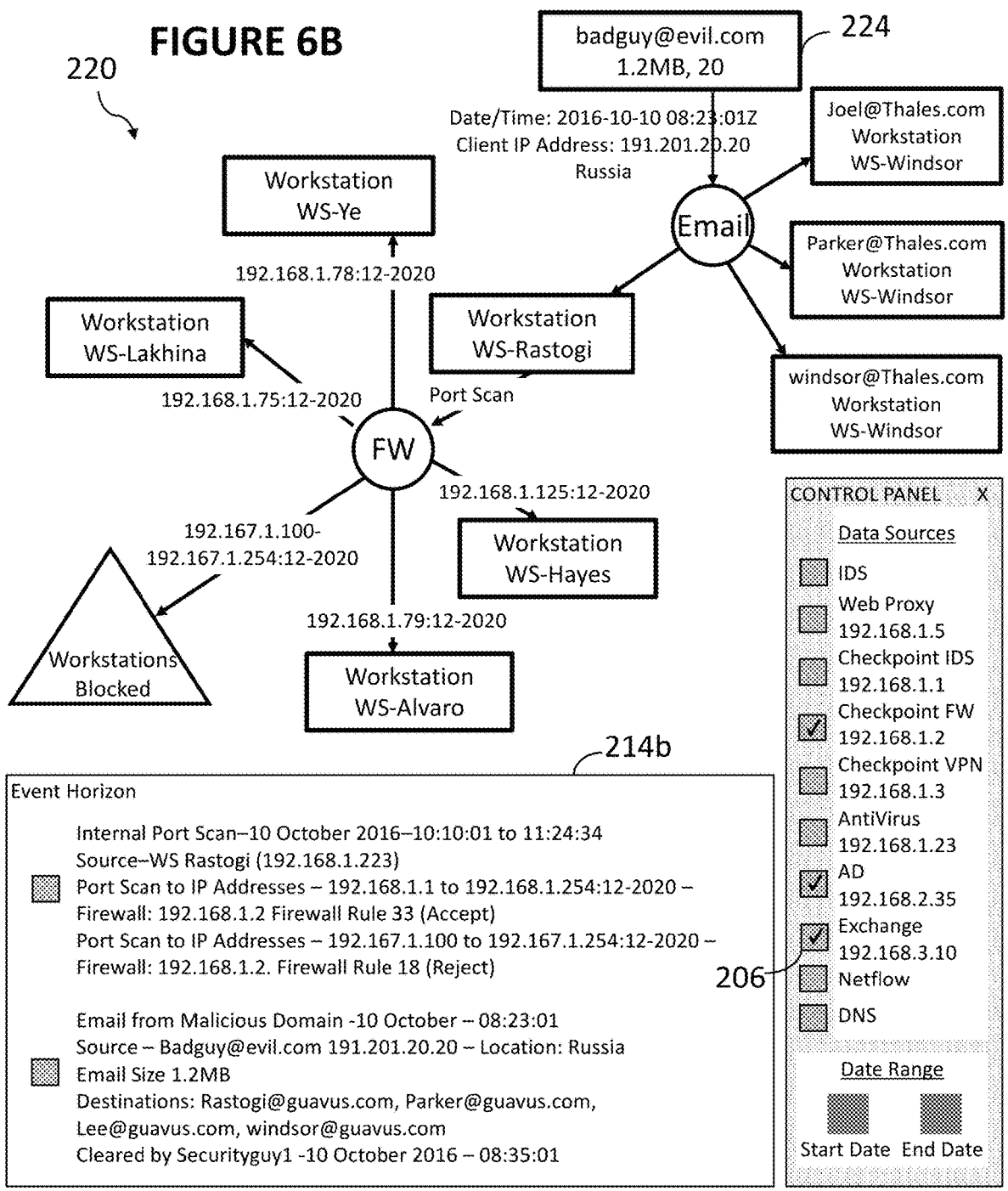
FIG. 6B shows a modified network graph.

The journey module 36 may also be used to present the curated data stream. The journey module is used to accelerate forensic discovery. Referring to FIGS. 6A and 6b, there is shown the illustrative output of a journey analysis for correlating security events and anomalies across timelines. This illustrative journey analysis may be performed by module 36, which was presented in FIG. 1. The illustrative journey module 36 may be configured to detect anomalous behavior that did not have an initial alert. Additionally, the illustrative journey module may be configured to detect changes in behavior that is triggered by automatic correlations that identified an infected workstation. The illustrative journey module may also detect multiple correlations to reduce false positive alerts. The illustrative journey module 36 may be integrated with a data protection solution such as Thales e-Security solutions.

By way of example and not of limitation, a journey may be triggered by an EPO alert. EPO refers to the McAfee ePolicy Orchestrator or "EPO" for short. EPO enables enterprise level control and monitoring for McAfee security clients. EPO alerts are automatic responses triggered by EPO events. An EPO event may be generated by client software, e.g. virus scan software.

In the illustrative EPO journey embodiment, an EPO alert is received. The EPO alert triggers a "find email with the suspicious attachment" task. This task may be accomplished by finding email(s) that have been sent within a few seconds before the EPO alert. The "find email with the suspicious attachment" task may also trigger a find sender(s) with anomalous number of emails and find other emails with similar subjects and size. An automated action may then be generated that sends an alert that states "do not open this email or attachment." The journey approach uses the EPO alert to automatically find all associated emails within seconds, reduces the spread of virus to other machines, and makes it possible to quickly implement methods to prevent the spread of the virus.

Another illustrative journey analysis utilizes the journey module 36, which uses Websense log analyses to detect a workstation that is hitting a malicious domain. For example, the illustrative non-rule based security detection system and method identified the workstation was sending emails with repeated subject lines and with two different sized attachments. The illustrative workstation was sending emails to domains located in 9 different countries, which was out of normal for the User's Organization. Anomaly detection was triggered based on identifying out-of-normal country codes, out-of-normal email volumes, consistent attachment size and consistent email subjects. No logs in antivirus (AV) alerts were discovered. Intrusion Detection Systems (IDS) show multiple alters for this user. Also, the workstation may be accessed using non-DNS sites in volumes out of normal compared to other users in the same organization.

The non-rule based security detection system and method must be able to send and receive updates from a trouble-ticketing system. The ticket process includes creating a trouble ticket, adding comments to trouble ticket, closing a trouble ticket, canceling a trouble ticket, and when a trouble ticket is created, the data is ingested and used to execute event history collections. By way of example and not of limitation, the TM forum trouble-ticket API may be employed. In the illustrative embodiment, each collector may collect 45,000 security logs per second per VM, and the SQL Queries may be completed in less than 5 minutes. With respect to reliability, the end to end system must support deployments with a reliability between 99.9% to 99.999%. The reliability is controlled by redundancy of key components. The security detection system and method demonstrate recovery from compute, storage and collector nodes. The security detection system and method demonstrates providing alarms and alerts via SNMP and Syslog during failures.

Figure 2:
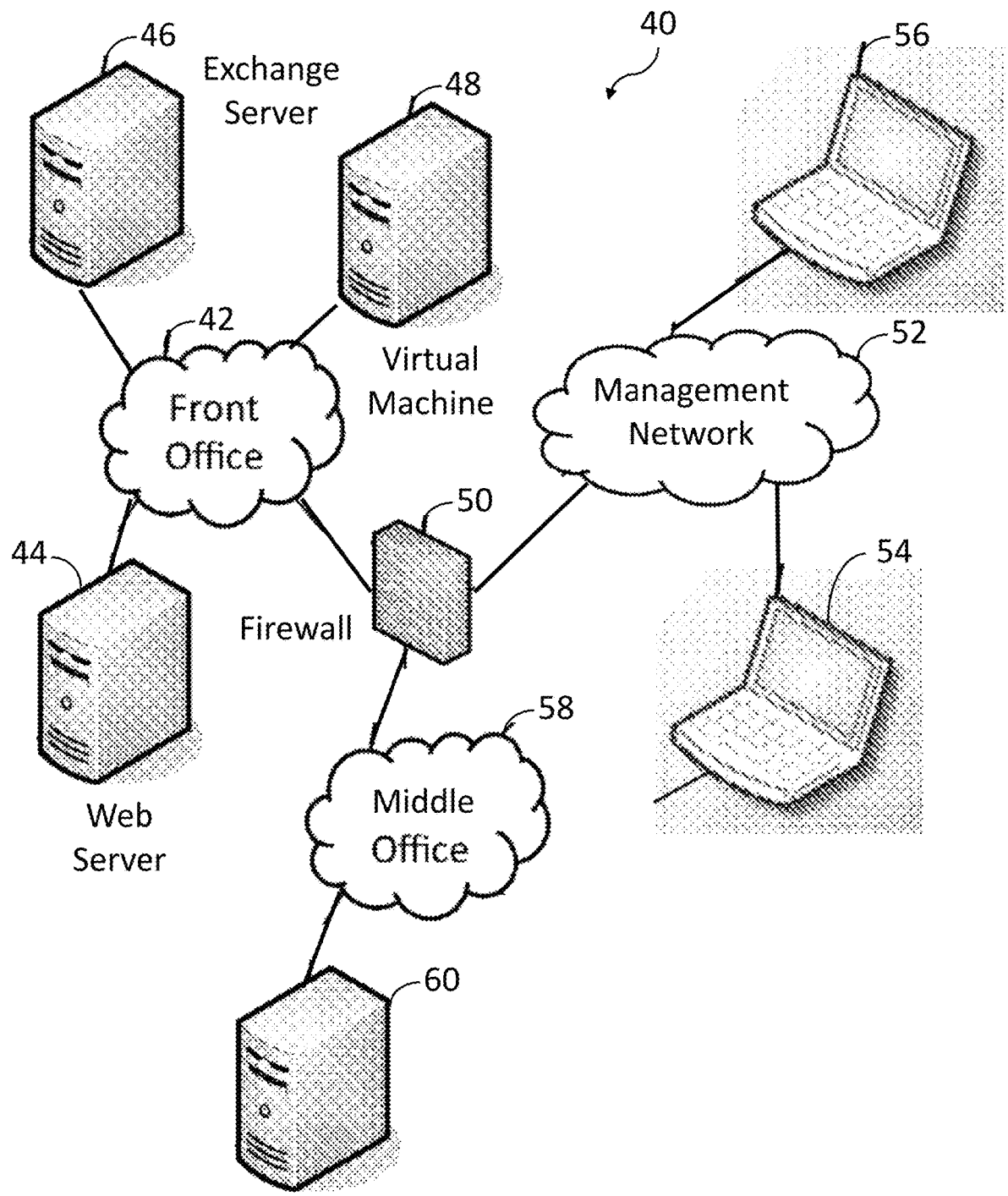
FIG. 2 shows a hardware system that supports the non-rule based security detection system and method described herein.

Referring to FIG. 2, there is shown an illustrative hardware system that supports the non-rule based security detection system and method described herein. The illustrative hardware system 40 includes a front office network 42, which further includes an illustrative web server 44, an illustrative Exchange Server 46 and one or more Virtual Machines 46. The illustrative front office network 42 is communicatively coupled to an illustrative firewall 50 that may also include a router capability. The front office network 42 collects data from the various data sources. A management network 52 may also be communicatively coupled to the firewall/router 50. The management network 52 supports communications between illustrative laptops 54 and 56.

Additionally, the illustrative hardware system 40 includes a middle office network 58 that resides behind the firewall/router 50. The middle office network 58 is communicatively coupled to one or more virtual machines 60, which are part of the middle office network 68. The middle office network supports the various databases and storage components described herein. For example, the middle office network 58 may be configured to support KAFKA storage or process. Recall, KAFKA is an illustrative distributed streaming platform. A plurality of virtual machines 60 may also support KAFKA, Apache Hadoop, HDFS, YAR, Spark Streaming and Spark SQL.

Figure 3:
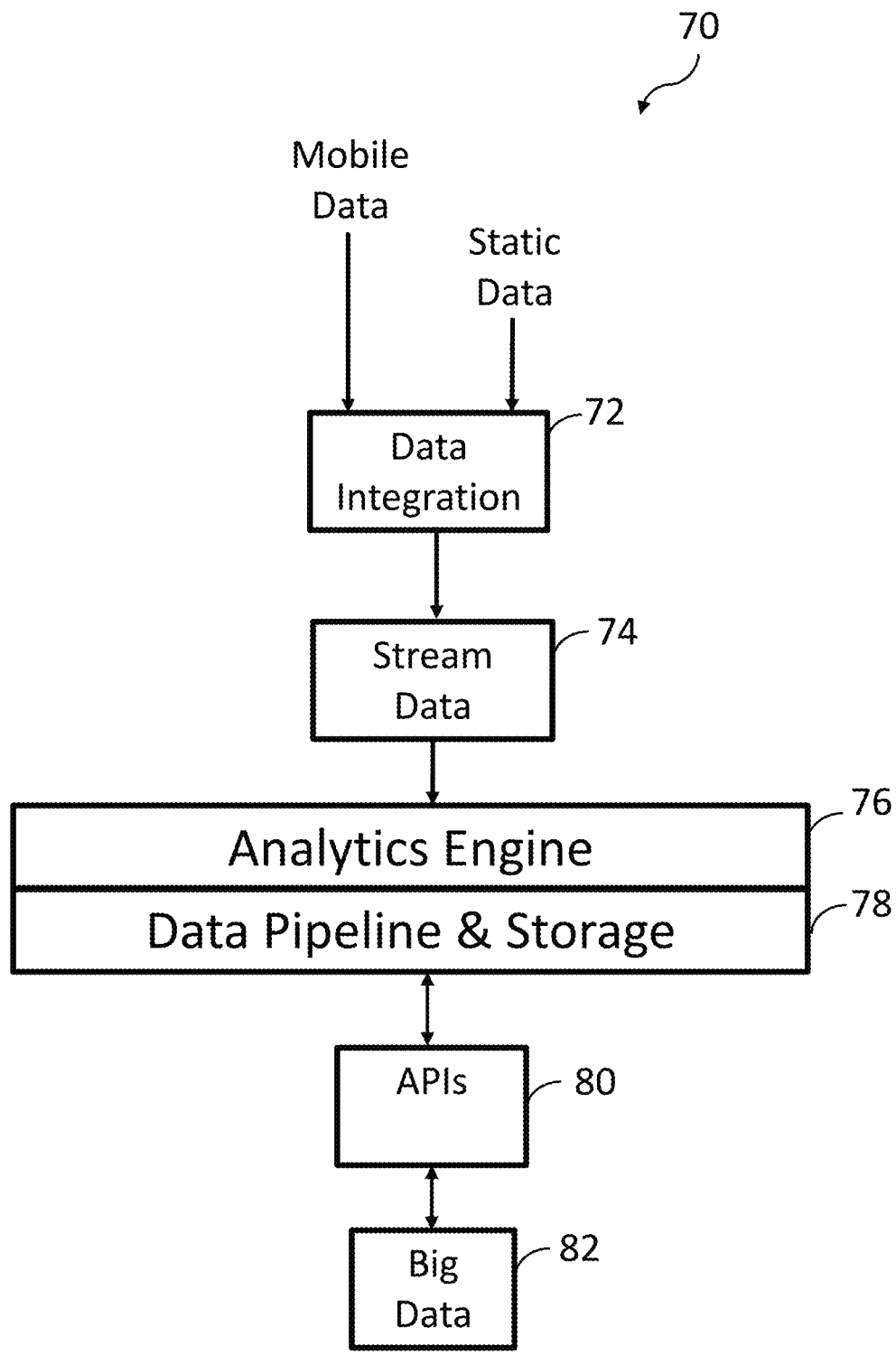
FIG. 3 shows an illustrative analytics engine that may integrate with the illustrative system architecture for the non-rule security detection system presented in FIG. 1.

Referring to FIG. 3, there is shown an illustrative analytics engine that may integrate with the illustrative system architecture 10 for the non-rule security detection system and method presented above in FIG. 1. The analytics engine 70 includes a data integration module 72 that receives data from mobile device, data from stationary or static device, and other such illustrative client devices. The data integration module 72 is configured to communicate the received streaming data to the analytics engine 76 via a stream data module 74. The stream data module 74 may include public REST APIs, stream direct adaptors and standardized collection with streaming and batch adaptors. The stream data module 74 may operate on the KAFKA distributed streaming platform.

By way of example and not of limitation, the analytics engine 76 includes one or more modules associated with the curation component 31, one or more modules associated with the interaction component 33, or any combination thereof as described above in FIG. 1.

In the illustrative embodiment, the data pipeline and storage component operates in a manner similar to database 24 and storage component 26 described above in FIG. 1.

The output forms the analytics engine 76 is communicated to a big data system 82 with a plurality of APIs 80. By way of example and not of limitation, the APIs may include a private User Interface REST API, a public Pull REST API and a Push API. Additionally, the API module may include a "sandbox" for data sets. The illustrative "sandbox" provides an environment to run untrusted and unauthorized application so that they cannot harm the analytics engine 76, the data pipeline and storage component 78 and the APIs 80.

The big data module 82 provide a big data ecosystem that supports "data lakes." A "data lake" is a storage repository that holds a vast amount of raw data in a native format. A hierarchical data warehouse stores data in files or folders. A data lake uses flat architecture to store data. In the illustrative embodiment, the big data module supports another sandbox environment that supports applications that interact with the data lake.

Referring to FIG. 4A through FIG. 4E, there is shown an illustrative method for implementing the non-rule based security detection method. The illustrative method may be initiated at block 101 where a plurality of data sources are identified. By way of example and not of limitation, the data source includes Active Directory (AD) Windows logs, user and workstation identity logs, web proxy logs, IDS logs, Exchange logs, firewall logs, IP and domain blocklist and country lists. Log management refers to the focus on simple collection and storage of log messages and audit trails.

The method then proceeds to block 102 where a baseline is generated for each data source. The baseline includes a plurality of data source outputs that are evaluated over a time period.

At block 104, the method proceeds to detect a plurality of data source anomalies, in which each data source anomaly is associated with at least one data source output exceeding a threshold for the data source baseline. Anomalous data flow is detected by establishing a baseline, monitoring activity in relation to the baseline over a time period, and then identifying a threshold that exceeds the baseline activity over a certain period of time, i.e. logging.

As presented herein, the term "baseline" applies to logging data associated with a data source over a period of time, during which little or no anomalous behavior is detected. Additionally, the term "baseline" refers to the use of block lists, black lists, white lists and grey lists. For example, a block list provides a baseline and anomaly detection, in which any element in the block list is denied access. Thus, for purposes of this patent, the term "baseline" is generally used to apply to logging data and the use of lists, unless the understanding is clearly distinguishable.

For example, baseline connection establishment rates show source address and destination IP of flows, port number, number of flow per IP, protocol, firewall interface and correlate to subscriber and departments. Thus, the baseline connection establishment rates can be plotted over a period of time, which would result in a baseline connection establishment rate log.

In another illustrative embodiment, anomalous data can be identified by comparing to a block list. A block list is a basic access control mechanism that allows through all elements, except those explicitly mentioned. Items on the block list are denied access. Thus, if there are any hits on the block list, then access is denied. For example, all destination IP addresses may be compared against the block list, and if any hit then determine all subscribers who sent packets to the destination IP address.

In yet another illustrative embodiment, a baseline is established for a plurality of servers accessing illustrative external IP addresses or domains and a block list may be used in combination. Anomalous data flow may be represented with at least one flag for out of normal baseline patterns or block list hits.

With respect to logging of data for developing a baseline that is used during anomaly detection, the security detection method monitors all data flows for out of normal use in non-domain sites. A non-domain website refers to one or more web pages that are accessed as sub-page of a domain with a URL, e.g. www.guavus.com~yourpage. Additionally, the security detection method monitors data flow out of normal use in domain sites.

The security detection system and method presented herein monitors the normal requests for domains that are on the block lists and correlates the domains on the block lists with usernames to determine if attempts to access these domains started on a specific date and time; and the method then determines patient zero.

Still another illustrative baseline can be established for a file sharing Software-As-A-Service (e.g. Box) that is not used by others in the department or organization. The method then proceeds to correlate username and times of day and days of week for file sharing activity.

Yet another illustrative baseline may be set up for web usage that deviates from other web usage in a particular department. Alerts regarding user activities that deviate from others in the same department may then be communicated to the illustrative system administrator.

Another illustrative baseline may be established for normal network usage, so that any Internal attempts to access network resources outside of normal usage would trigger an alert.

In still a further embodiment, a baseline of data flow from an internal port scan or external port scan may be used to identify internal IP addresses or external IP addresses that send packets to multiple port numbers or protocols. Additionally, the baseline data flow may also include geolocation information associated with external IP addresses. Alerts may be generated based on activity exceeding some normal usage.

At block 105, a geolocation for each data source anomaly is identified. The geolocation may be determined using IP address location or any other such location based service. Additionally, at block 106, a correlation is generated for the plurality of data source anomalies and the geolocation for each data source anomaly.

At block 108, the correlation is associated with a security event. An illustrative example of a security event includes authentication events, audit events, intrusion events, and anti-virus events, and these events are usually stored in operating system logs, security logs or database tables. Information captured in security logs is often critical for reconstructing the sequence of events during the investigation of a security incident, and monitoring security logs may identify issues that would be missed otherwise. The problem is that the vast amount of data generated by security devices and systems cannot be manually reviewed. Thus, to monitor security events a Security Event Manager (SEM) is used to provide real-time monitoring, correlation of events, notifications and console views.

The method steps described between process blocks 101 and 108 reflect that the identification of geolocation for each data source anomaly (at block 105) and generating a correlation with the geolocation for each data source may be required. However, there may be instances where geolocation is not necessary. For example, port anomaly security detection may be performed without a particular event, in which anomalous firewall activity is identified in a first port where the firewall drops the connection request; and the anomalous firewall activity is associated with a particular IP address. The non-rule based security detection system man then automatically correlate other connection attempts to the same IP address, which may find that a successful connection to a second port with no other inbound traffic. An alert may be generated that the firewall configuration allowed inbound packets on the second port. The illustrative port anomaly detection presented above does not rely on geolocation. Additionally, the illustrative port anomaly detection detects abnormal threat activity, misconfigurations in the illustrative firewall security systems, and changes in user and network behavior before probe activity escalates to a full exploit.

Note, a Security Information Management (SIM) provides long-term storage as well as analysis and reporting of log data. Also, Security Information and Event Management (SIEM) combines SIM and SEM and provides real time analysis of security alerts generated by network hardware and applications.

Figure 4A:
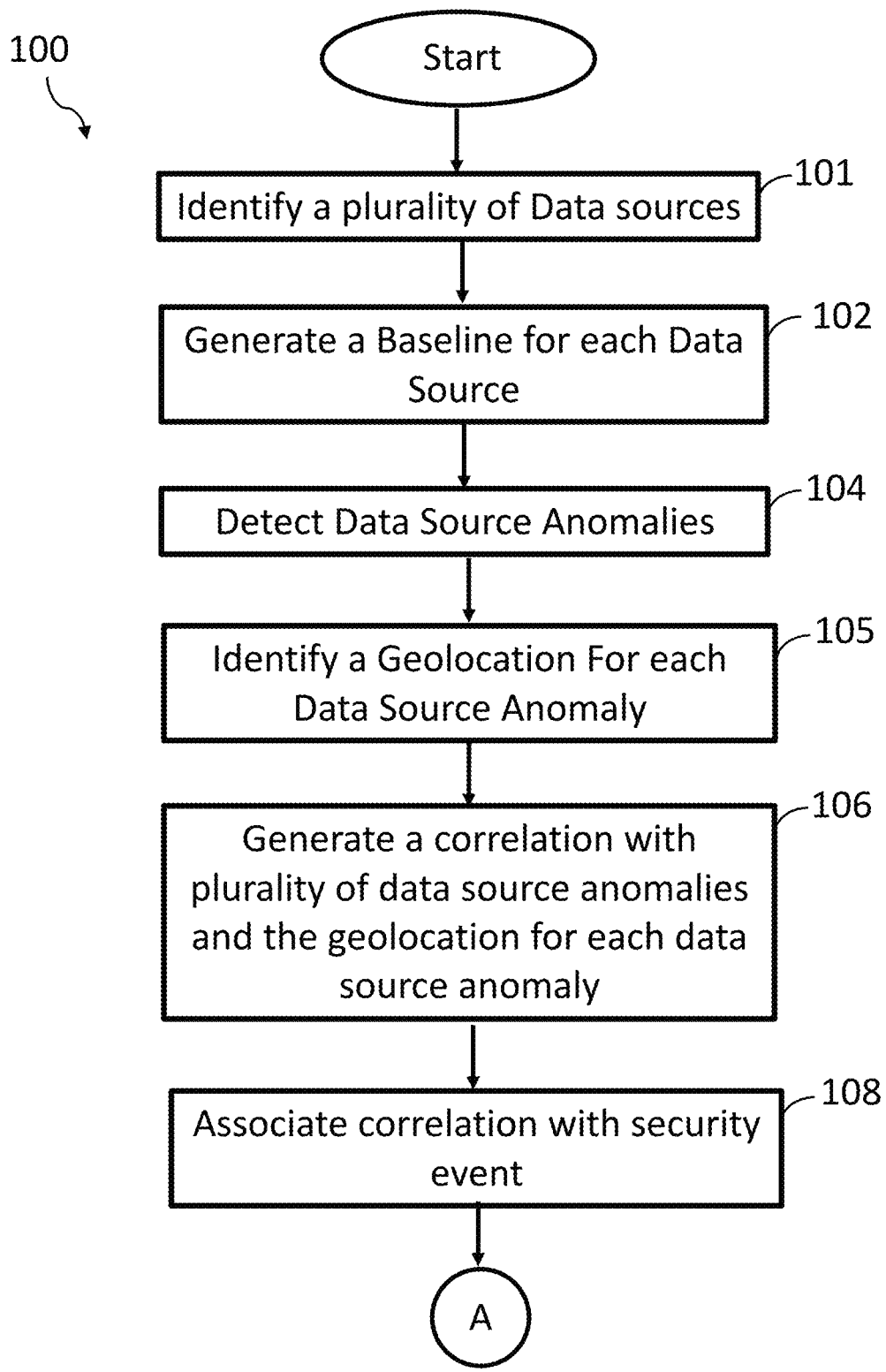
FIG. 4A shows an illustrative method for implementing the non-rule based security detection method.
Figure 4B:
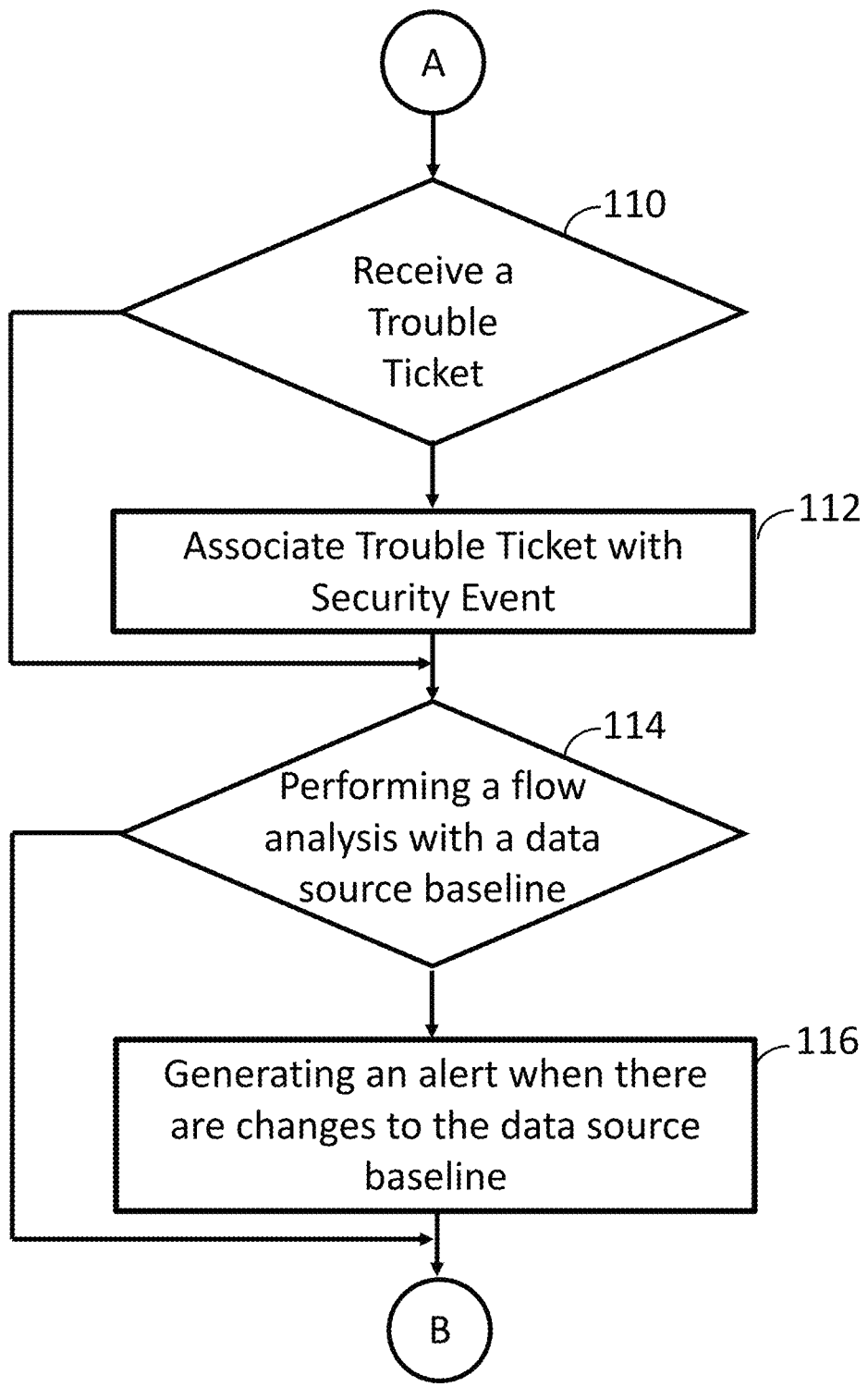
FIG. 4B shows an illustrative method for handling a trouble ticket.

Referring now to FIG. 4B there is shown an illustrative method for handling a trouble ticket. The non-rule based security detection method presented herein may be configured to send and receive updates from a trouble-ticketing system. The ticket process includes creating a trouble ticket, adding comments to trouble ticket, closing a trouble ticket, canceling a trouble ticket, and when a trouble ticket is created, the data is ingested and used to execute event history collections. By way of example and not of limitation, the TM forum trouble-ticket API may be employed.

By way of example and not of limitation, there is shown a decision diamond 110, in which a determination is made whether a trouble ticket has been received. If a trouble ticket has been received, then the method proceeds to block 112, where the trouble ticket is associated with at least one security event. If a trouble ticket is not received at decision diamond 110, the security detection method proceeds to decision diamond 114, where a flow analysis may be performed. If a flow analysis is performed at decision diamond 114, then a data source baseline is established for at least one data source.

Figure 4C:
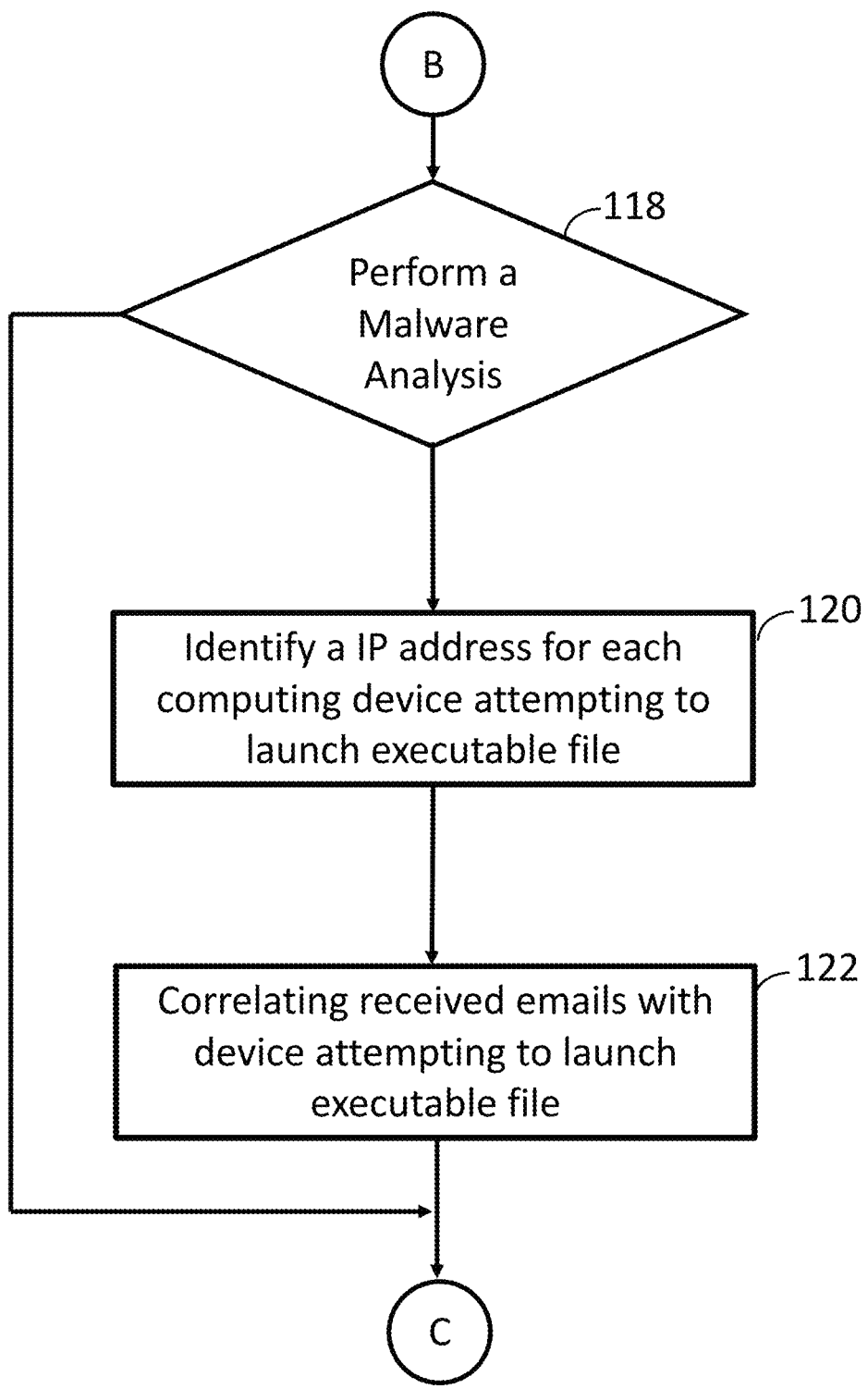
FIG. 4C shows a malware analysis.

Referring to FIG. 4C there is shown, there is shown a decision diamond 118 for performing a malware analysis. When a malware analysis is performed, an executable filed is identified which triggers generating an alert. The method then proceeds to block 120 where an IP address is identified for each computing device attempting to launch the executable file. At block 122, a plurality of received emails are correlated with the computing device attempting to launch the executable file.

For malware and security risks, correlation and anomaly detection based on data from web proxy, user identity, workstation identity, IDS logs, firewall, EPO log and Malicious Domain List (MDL) is performed. An EPO log refers to McAfee ePolicy Orchestrator (EPO) log files, which is a security management software solution the supports the management of endpoints, networks, data and compliance solutions.

McAfee ePolicy Orchestrator is the management component of McAfee Threat Intelligence Exchange that provides a console and dashboards form which an administrator can manage reports, alerts, system status and so on. McAfee can uniquely detect a networked system or device affected by some threat and immediately push that information to the connected systems, effectively stopping that threat from spreading.

For external IP addresses attempting to connect to the network that are on the Malware Domain List (MDL) IP addresses, these external IP addresses are identified as a security risks.

With respect to malware and security risks for internal IP addresses, a variety of methods may be used to determining a security risk. For example, an EPO alert may be detected that identifies a file attempting to execute and the IP address or IP addresses of the endpoint devices that file is to attempting to launch on. The security detection method may then correlate to users who received emails from a domain on the Malware Domain List (MDL), or may identify an increase in email volume to other internal IP addresses and external IP addresses with attachments and determine likely routes of infection and patient zero.

Malware and security risks may also be identified by receiving a list of all accepted inbound source IP addresses and protocols and then removing destination IP addresses that correlate to subscribers. The remaining inbound source IP addresses are then analyzed to find any outliers from the normal, which are presented as open ports and possible risks.

Malware and security risks may be identifying internal hosts that are communicating with servers on the Malicious Domain List (MDL) and identifying internal hosts with one or more connections to MDL IP addresses. Additionally, malware and security risks may be detected by correlating Intrusion Detection System (IDS) logged events with internal servers that are contacting external IP addresses. More generally, malware and security risks may be detected my monitoring internal server or workstations that are sending packets to other servers and networks that are identified as anomalous activity.

Figure 4D:
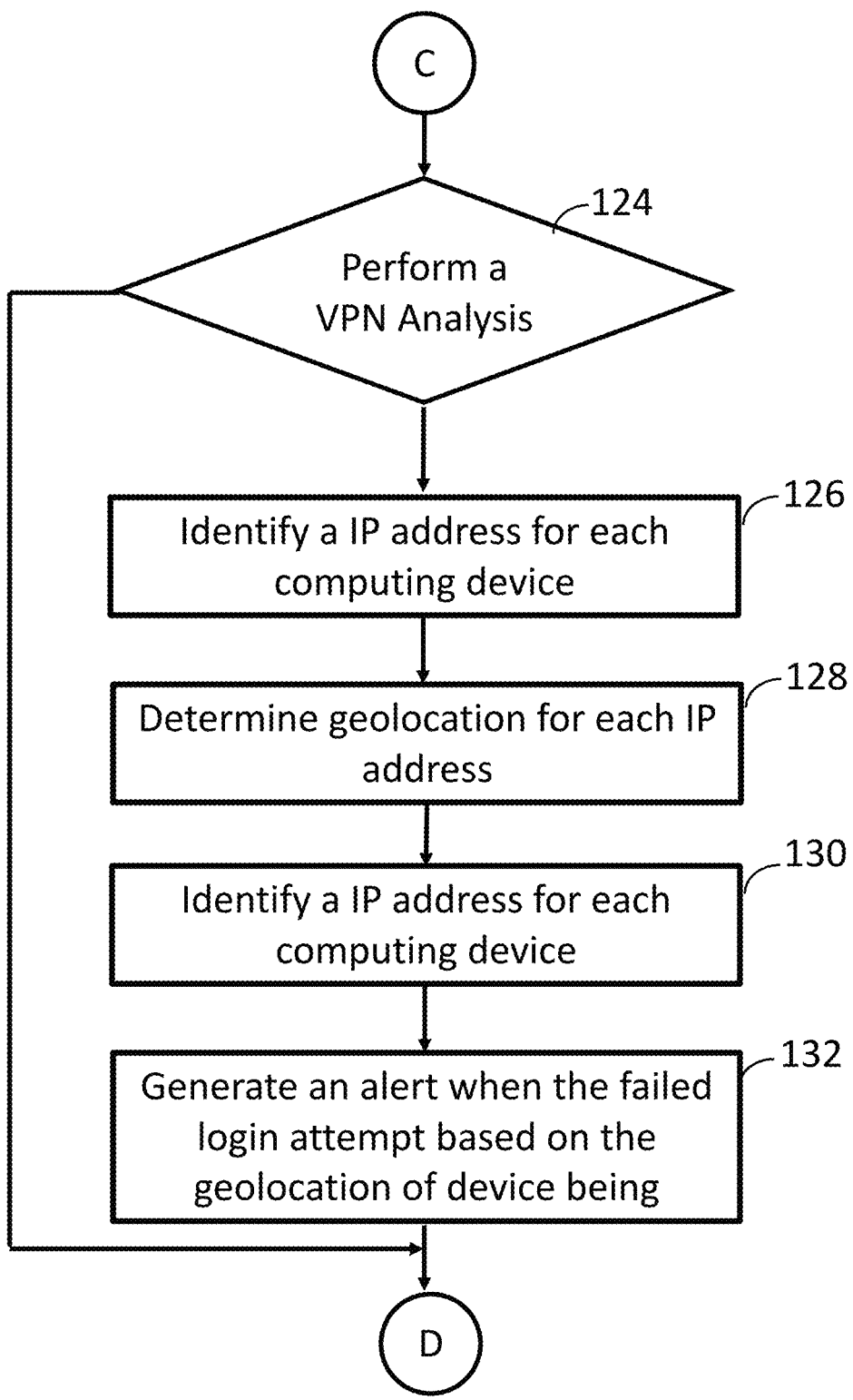
FIG. 4D shows a Virtual Private Network (VPN) log analysis.

Continuing to FIG. 4D, there is shown a decision diamond 124 for performing a Virtual Private Network (VPN) log analysis. A VPN analysis includes establishing a VPN connection baseline for a plurality of computing devices. The method then proceeds to block 126 where an IP address is identified for each computing device.

At block 128, the geolocation for each IP address is determined. Continuing to block 130, a failed login attempt based on the geolocation of the computing device is identified. More specifically, the computing device that attempted the failed login is identified at block 130. At block 132, the method proceeds to generate an alert when the failed login attempt based on the geolocation of the computing device is inconsistent with the VPN connection baseline.

The VPN log analysis is performed by correlating and performing anomaly detection based on data from an Active Directory (AD) and Local Directory Access Protocol (LDAP), VPN logs and Internet Protocol geography tables. The VPN log analysis relies on a variety of baselines to determine the normal VPN connections including username, time of day, frequency, duration, protocol, rule UID and source geolocation.

The VPN log analysis may also include determining the geolocation for all source IP addresses that are accessing the network via the VPN. The VPN log analysis continues by identifying changes to the geolocation of the source IP addresses. The VPN log analysis may also include a failed login list and may then proceed to correlate the geolocation of source IP addresses, username, and login frequency. An alert or flag is generated that identifies failed login attempts that are out of the normal pattern. Finally, the VPN log analysis is configured to identify simultaneous login events.

Figure 4E:
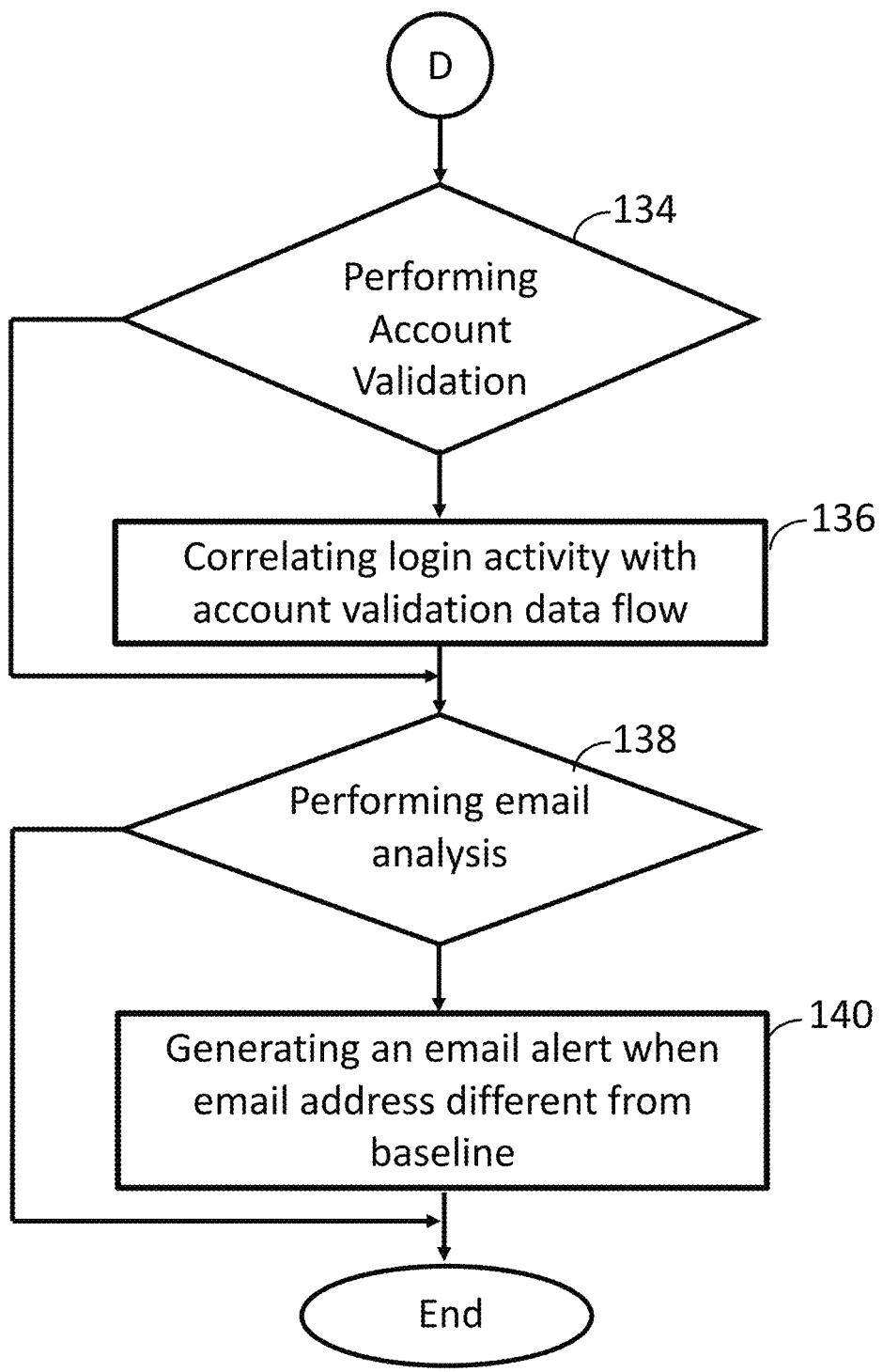
FIG. 4E shows an account validation analysis.

Referring to FIG. 4E, a decision diamond 134 for performing an account validation analysis is presented, in which an anomalous account validation data flow is detected over the time period. The method then proceeds to block 136 where at least one administrator login activity and a privileged user login activity is correlated with anomalous account validation data flow.

With respect account validation, correlation and anomaly detection is based, by way of example and not of limitation, on data from Active Directory (AD), Local Directory Access Protocol (LDAP), user identity, workstation identify, VPN logs, email logs, proxy logs, and IP block lists.

With respect to account validation, alerts may be communicated when a correlation is found between multiple failed login attempt events, dates, times, user names and block list activity. With respect to account validation, alerts may also be communicated when there are changes in privilege level on any account.

With respect to account validation, the administrator and privileged login activity may be correlated with the systems accessed, times and frequency of usage, unusual behavior back to email activity and blocklist hits and email or flow activity from those systems outside of the network. With respect to account validation, login failures may be recorded using non-active user names. The login failures may then be correlated to systems with similar attempts, which are used to determine patient zero. Login failures are also correlate to flow records and block list hits.

With respect to account validation, a baseline of logon and logoff events and alerts may be associated with deviations from normal logon and logoff events including time of day, day of week, volume and failures. Alerts may be generated based on changes in privileges for any Organization Unit or User, provide the name of the User making the change with the name(s) of the people whose privileges changed.

At decision diamond 138, an email analysis may be performed, in which an email baseline is determined. The method then proceeds to generate an email alert when an email address operates inconsistently with an email baseline. An email analysis includes correlation and anomaly detection based on data from Active Directory, LDAP, user identity, workstation identity, email logs and malicious domain tables and other such email related systems.

A variety of email baselines may be generated. The email baseline includes the number of messages sent and received by each subscriber and department. The email baseline also includes the attachments size and volume by each subscriber, destination and department. Additionally, the email baseline includes the number of recipients in emails. Furthermore, the email baseline includes volumes of messaging to personal addresses and geography based on username, location and department.

At block 140, email alerts may be generated based on emails sent to domains on the MDL. The source domains compared to block list and alerts are generated for inbound emails associated with malicious domains. New source email addresses may also be reported.

With respect to scalability, the non-rule based security detection system and method described herein demonstrates the ability to independently scale up and scale down each component. The increase and decrease of each resource in the security detection system is based on performance of each component and does not require each portion of the security detection system to be scaled up at once.

There are a variety of threat intelligence tools that may utilized to implement the security detection system and method presented herein. The system should be able to collect and share threat intelligence via the standardized mechanisms supported by OASIS Cyber Threat Intelligence (CTI). The OASIS CTI Technical Committee (TC) was chartered to define a set of information representations and protocols to address modelling, analyzing, and sharing cyber threat intelligence. In the initial phase of TC work, three specifications will be transitioned from the US Department of Homeland Security (DHS) for development and standardization under the OASIS open standards process: STIX (Structured Threat Information Expression), TAXII (Trusted Automated Exchange of Indicator Information), and CybOX (Cyber Observable Expression).

Trusted Automated eXchange of Indicator Information (TAXII) defines a set of services and message exchanges that, when implemented, enable sharing of actionable cyber threat information across organization and product/service boundaries for the detection, prevention, and mitigation of cyber threats. TAXII is not a specific information sharing initiative, and it does not define trust agreements, governance, or non-technical aspect of cyber threat information sharing. Instead, TAXII empowers organizations to achieve improved situational awareness about emerging threats, and enables organizations to easily share the information they choose with the partners they choose, while leveraging existing relationships and systems.

Structured Threat Information Expression (STIX) is a language used to describe cyber threat information in a standardized and structured manner. STIX characterizes an extensive set of cyber threat information, to include indicators of adversary activity (e.g., IP addresses and file hashes) as well as additional contextual information regarding threats (e.g. adversary tactics, techniques and procedures (TTPs); exploitation targets; campaigns; and courses of action (COA) that together more completely characterize the cyber adversary's motivations, capabilities, and activities, and, thus, how to best defend against them. STIX is intended to support both more effective analysis and exchange of cyber threat information.

Cyber Observable eXpression (CybOX) is a standardized language for encoding and communicating high-fidelity information about cyber observables, whether dynamic events or stateful measures are observable in the operational cyber domain. CybOX is not targeted at a single cyber security use case but rather is intended to be flexible enough to offer a common solution for all cyber security use cases requiring the ability to deal with cyber observables. CybOX is intended to be flexible enough to allow both the high-fidelity description of instances of cyber observables that have been measured in an operational context as well as more abstract patterns for potential observables that may be targets for observation and analysis apriori.

Collective Intelligence Framework (CIF) supports combining known malicious threat information from many sources and use that information for identification (incident response), detection (IDS) and mitigation (null route). The most common types of threat intelligence warehoused in CIF and IP addresses, domains and URLs that are observed to be related to malicious activity. CIF may be used to share threat data between user groups and systems. A user interface for the configuration of CIF attributes for the sharing of the data between the Cyber Security application and other system may be provided.

Figure 5:
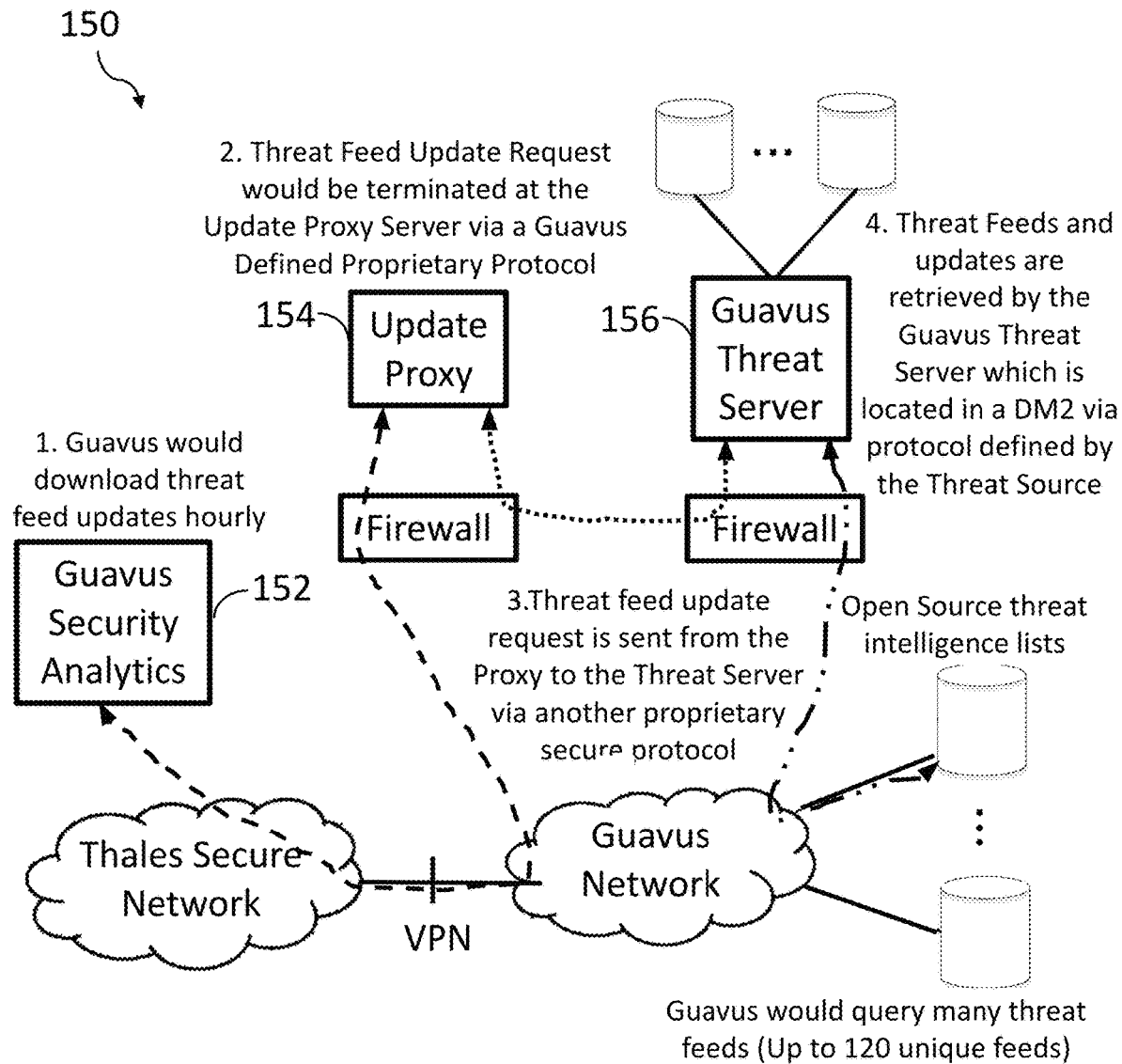
FIG. 5 shows a system for updating a threat list.

Referring to FIG. 5 there is shown a non-rule based security detection system 150 that updates threats lists. In the illustrative embodiment, the system 150 downloads a threat list on a periodic basis, e.g. every hourly, to a security analytics module 152. A proxy server 154 is communicatively coupled to the security analytics module 152. The proxy server 154 receives an updated threat list from the security analytics module 152. The threat list is updated using a single port that is opened between the security analytics module 152 and the proxy server 154, which is installed in a DMZ that resides on a secure network.

A DMZ is also referred to as a demilitarized zone is a physical or logical subnetwork that contains and exposes an organization's external-facing service to an untrusted network, such as the Internet.

A second DMZ separates the proxy server 154 from a threat server 156, which is connected to the Internet and allows threat lists to be updated hourly. In the illustrative embodiment, the threat server 156 may be the source for aggregated threat data that can be optimized and tuned based on its effectiveness.

In the illustrative non-rule based security detection system 150 the updated threat lists, there are various data sources used for threat identification that are continuously validated for effectiveness. For example, if a threat list does not provide hits or is largely redundant, the threat list will be removed and replaced with another threat list. The process or removing and replacing threat lists is automated and audited by security team members on a regular basis.

The non-rule based security detection system and method presented herein may be configured to use many different threat lists to maximize the coverage of threats. Additionally, the non-rule based security detection system and method continuously reports the threat list efficacy, and monitors the effectiveness of each individual data source to ensure that the performance of the overall system has not decayed.

Referring to FIG. 6A and FIG. 6B, there is shown an illustrative network graph. In general, the network graph associates IP addresses with user names and workstation names, server names and server functions. In the illustrative embodiment, the network graph creates a consistent map of user names, workstation names, server names and server functions for IP addresses. The network graph is necessary due to frequent changes in IP addresses, thus, there is a need for the consistent map of user names, workstation names, server name, server functions for IP addresses and other such information that would be specific to a client, server or node device.

The network graph provides "network mapping," which creates a long-term mapping of IP addresses to devices that will be used for correlations that may persist longer than the DHCP lease. Illustrative data used for network mapping includes, but is not limited to, data and time, IP addresses, user name, workstation name, organization unit, inbound port (used to determine function). By way of example and not of limitation, this network mapping must be maintained for 12 months.

In FIG. 6A, the illustrative network graph 200 includes a control panel 202 with a plurality of data sources. One of the selected data sources is related to a firewall 204 and an Active Directory (AD) service 206. Active Directory is a directory service that Microsoft developed for Windows domain networks that includes a domain controller. A domain controller authenticates and authorizes all users and computers in a Windows domain type network by assigning and enforcing security policies for all computers and installing or updating software.

After the data sources are selected a first network graph 208 is generated. The network graph 208 shows the illustrative workstation 210 that is communicatively coupled to firewall symbol 212, which is associated with selected firewall 204. An event horizon window 214a is also shown in FIG. 6A. The event horizon window 214a includes a record of an internal port scan that was initiated by WS-Rastogi 216. As reflected by the event horizon window 214a, a port scan was subsequently performed.

Referring to FIG. 6B, a modified network graph 220 is presented. The modified network graph 220 includes an updated control panel 202, in which the Exchange data source 222 has been selected. The Exchange data source 222 is associated with email communications. The event horizon 214b indicates that email from a malicious domain was received. The source of the email was badguy@evil.com, was 1.2 MB, and this email was sent to a variety of destination email addresses. The event horizon 214b indicates that the malicious email was cleared by a security professional.

The network graph 220 presents a visual representation of the events described above. The network graph 220 includes a red highlighted box 224 that indicates that the email from a malicious domain was received and distributed to a variety of different email addresses and the corresponding workstations.

The non-rule based security detection system and method described above may be configured to automatically identify changes in the normal behaviors computed from logs being collected for user behavior, workstation and server behavior and network behavior. The non-rule based security detection system and method may be configured to automatically correlate anomalies to determine the most likely root cause, other infected workstations or servers and mode of infection.

The non-rule based security detection system and method may also be configured to provide alerts to the operation via the user interface (UI). The alerts may also be ranked based on severity of the alert. The operator may clear alerts so they are removed from the UI. The operator may select an alert to being manual forensic analyses with the ability to add data from twelve (12) months prior to the current time.

As presented above, the non-rule based security detection system and method may also be configured to allow an operator to add or remove data sources from the visualization to enhance the nodal analysis and visualization.

Additionally, the non-rule based security detection system and method may also prioritizes alerts. For example, a red alert represents a severe and immediate action is required as shown in FIG. 6B. These security threats include direct threats to the network such as internal port scans, DDoS activity, block list IPs not blocked by the firewall or intrusion detection systems. Additionally, servers or workstations attempting to reach a botnet using command and control software also may qualify as a red alert. Furthermore, alerts associated with an executable file in a temporary folder are also identified as a red alert. Further still, login attempts with user names that are already logged also trigger red alerts.

Another illustrative alert is the moderate alert, which may be represented as an orange alert. The illustrative orange alert may include email from malicious domains, email with similar conditions forwarded to others in the company, multiple failed login attempts, login attempt from a VPN from an unknown country and attempts to reach a server, e.g. DNS, with incorrect IP/port combination.

Yet another illustrative alert is an informational alert, which may be represented as a yellow alert. For example, a yellow alert may include block list hits that are blocked by the firewall or the intrusion detection system. Another informational alert may be triggered by the login pattern on a workstation or server that is out of normal usage; this may include generating a baseline as described above. Additionally, informational alerts may be generated based on the network flow volume for a workstation that is out of normal. Furthermore, informational alerts may be based on a significant change in email volume from a user. Further still, informational alerts may be generated based on new or never before seen network flows.

Referring now to FIG. 6C, there is shown an illustrative dashboard 230. A variety of dashboards may be presented for the various reports and dashboard displays. For example, a firewall, IDS and proxy dashboard may exist in which the device with the most events, top events, number of events per hour by severity and histogram of events from each log generator is presented. Additionally, a firewall rule_UIDs that is fired per day by count and having an associated histogram may also be presented.

A login failure report and dashboard may also be presented, which includes login failures to servers, systems, attempts, fails, successes, volume, top users, departments and most normal activity.

In illustrative dashboard 230, IP addresses and domains may also be presented. More specifically, the dashboard 230 may include a top source IP addresses and domains section 232 that includes the geographic location of the top source IP addresses and domains.

Furthermore, another dashboard may be generated for top destination IP addresses and domains that includes their respective geographic locations. Further still, yet another report and dashboard may be generated for top malicious IP addresses, domains and their related geographic locations. A top content report and dashboard may also be generated, in which domains, geographic locations of domains, email destinations, geographic locations of email destinations and top departments are presented.

The illustrative dashboard 230 includes a malware section 234 where malware events are presented. Additionally, antivirus threats may also be presented. The report and dashboard may include hits on a block list for a period of time and the ability to zoom into the users. The malware and antivirus section may also include attempts to hit block list IP addresses and emails with block list domains. Furthermore, the dashboard may include programs attempting to run in temp folders and the ability to zoom into the users with programs attempting to run in temp folders.

The dashboard 230 may also include a list of top users section 236 and information about the number of files accessed and the average file size. The dashboard 230 may also include a top email section 238, in which the top users are identified based on email messages by volume, SaaS usage, web content by volume, top alerts by subscriber and department, and most out of normal activity.

The dashboard 230 may also include a top blocklist events section 240 that presents the number of events, the source device and top site or domain that is accessed by the source device. A report and dashboard may also be presented for a variety of different alerts that may include, but are not limited to, inside network port scans, outside of normal flow activity, increased login failures from multiple hosts, increased blocklist activity, increased AV activity, out of normal email usage, out of normal privileged account activity, login attempts with non-active user names, geographical irregularities on inbound and outbound flows and email, large change in flow volume, IP and port mismatches towards known services, (e.g. port 80 to DNS), and abnormal flow volume from a single server or workstation.

Further still, the dashboard 230 may also include a top firewall events section 242. The top firewall section 242 includes the firewall IP address, the top action or rule and the total number of events associated with the particular firewall.

The dashboard 230 may include a security alerts section 244 having a log of alerts and actions taken for each of these alerts. The dashboard 230 user interface (UI) may also support a variety of different actions. For example, the dashboard 230 may support the action of clicking on an alert that subsequently shows all supporting information about the alert to include all correlations for forensic purposes. The correlations may include changes in baseline trends that may be presented as a graph or in a tabular form. The correlation may also include geographical irregularities should be shown on a globe and as tabular form. Alerts may be dismissed and the username and time will be recorded and stored for approximately 12 months.

In operation, the security detection method allows data to be accessed via a SQL database. Additionally, the dashboard allows reports to be downloaded to pdf and .csv. The security detection system and method includes a search capability that searches attributes having alerts generated by another security appliance. Furthermore, the search capability may be integrated into one or more dashboards. The illustrative search capability may allow the operator to search for source IP addresses or destination IP addresses, usernames, email address, email attachment sizes, search during a time frame, and search for multiple fields to be used in the search criteria.

The non-rule based security detection system and method provides support for third party data sources such as OSINT having IP threat reputation, malicious domain blocklists and an IP geo database. New data sources may be added to detect and mitigate security threats.

The non-rule based security detection system and method also has cloud deployment support. For example, the security detection system and method provides support for Openstack release 1.0. The security detection system and method may also be deployable in AWS and Azure and may also have Hypervisor support for VMWare ESX, Microsoft Hyper-V, KVM and XEN.

Figure 7:
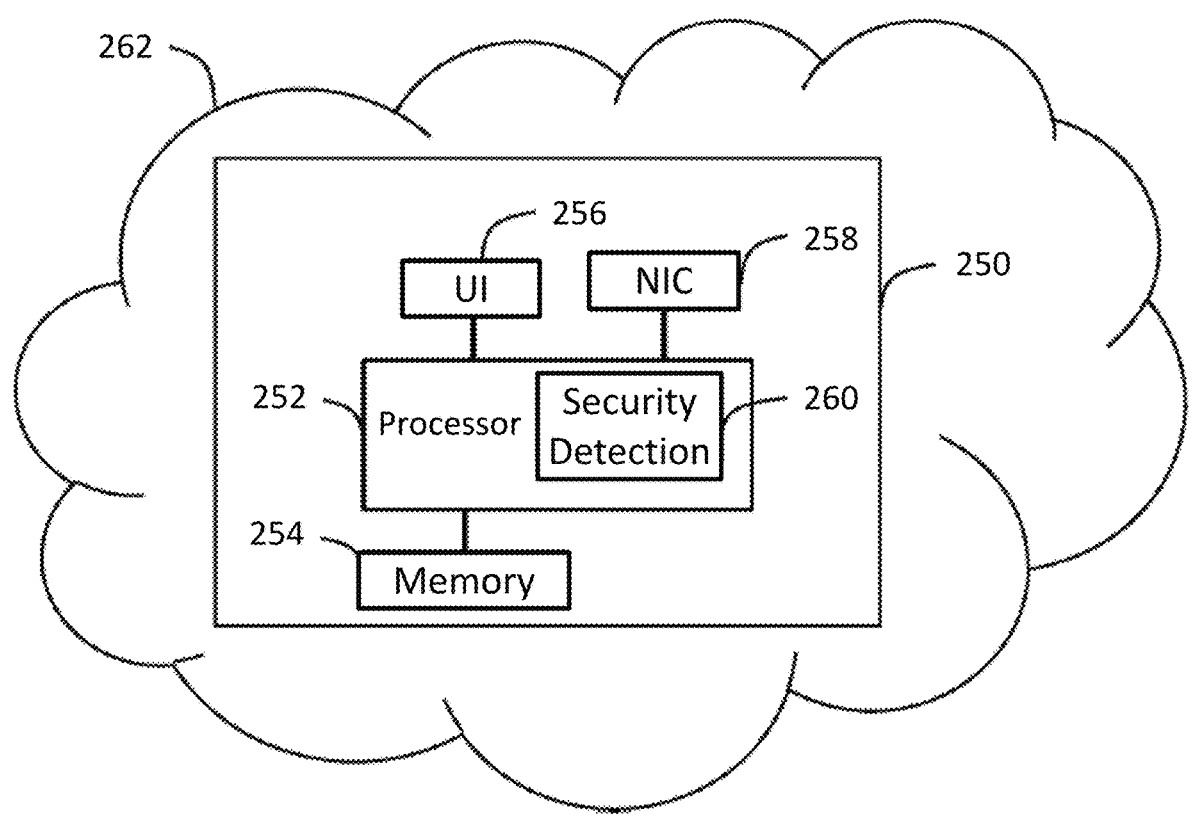
FIG. 7 shows an illustrative sub-system 250 that is communicatively coupled or associated with the one or more of components or modules.

Referring to FIG. 7, there is shown an illustrative sub-system 250 that is communicatively coupled or associated with the one or more of components or modules described above. The sub-system 250 is configured to interface with the database 24 and storage component 26.

More specifically, the sub-system 250 includes at least one processor 252 that is communicatively coupled to a memory 254. Multiple processors may also perform the operations described. Additionally, the illustrative sub-system communicates with a user interface (UI) 256 that receives inputs that are processed by illustrative processor 252. The sub-system 250 may also be networked to other sub-systems with an illustrative network interface card (NIC) 258 or other communications pathways, e.g. a serial bus. A non-rule based security detection module is provided in illustrative software module 260.

The sub-system 250 may operate in centralized system architecture, distributed system architecture or any combination thereof. Additionally, the operations performed by the sub-system 250 may be performed by any network asset that is securely accessible by an ISP 262.

The non-rule based security detection system and method presented above can analyze a plurality of data sources, generated a baseline for each data source and these baselines are analyzed for anomaly detection purposes. A geolocation may be associated with each anomaly and a correlation may be established between the data source anomalies and the geolocation for each data source anomaly. Various alternative embodiments to the non-rule based security detection system and method may perform similar tasks using different systems and methods.

It is to be understood that the detailed description of illustrative embodiments is provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A non-rule based security detection method comprising:
    communicatively coupling a sub-system to at least one computing device of a plurality of computing devices, wherein the sub-system includes a processor, memory, and security detection module, wherein each computing device of the plurality of servers is associated with at least one data source of a plurality of data sources;
    identifying, by the security detection module, the plurality of data sources;
    generating, by the security detection module, a baseline for each data source, wherein the baseline includes a plurality of data source outputs that are evaluated over a time period;
    detecting, by the security detection module, a plurality of data source anomalies, in which each data source anomaly is associated with at least one data source output exceeding a threshold for the data source baseline;
    identifying, by the security detection module, a geolocation for each data source anomaly;
    generating, by the security detection module, a plurality of correlations with the plurality of data source anomalies and the geolocation for each data source anomaly; and
    associating, by the security detection module, at least one correlation with a security event.

2. The security detection method of claim 1 further comprising,
    receiving, by the sub-system, a trouble ticket, and
    associating, by the security detection module, the trouble ticket with at least one security event.

3. The security detection method of claim 1 further comprising,
    performing, by the security detection module, a flow analysis, in which a data source baseline is established for at least one data source, and
    generating, by the security detection module, an alert when there are changes to the data source baseline.

4. The security detection method of claim 1 further comprising,
    performing, by the security detection module, a malware analysis, in which an alert is detected that identifies an executable file,
    identifying, by the security detection module, an IP address for each computing device of the plurality of computing devices attempting to launch the executable file,
    correlating, by the security detection module, a plurality of received emails with a computing device of the plurality of computing devices attempting to launch the executable file.

5. The security detection method of claim 1 further comprising,
    performing, by the security detection module, a Virtual Private Network (VPN) analysis, in which a VPN connection baseline is established for the plurality of computing devices,
    identifying, by the security detection module, an IP address for each computing device of the plurality of computing devices,
    determining, by the security detection module, a geolocation for each IP address;
    identifying, by the security detection module, a failed login attempt based on the geolocation of the computing device of the plurality of computing devices that attempted the failed login; and
    generating, by the security detection module, an alert when the failed login attempt based on the geolocation of the computing device of the plurality of computing devices is inconsistent with the VPN connecting baseline.

6. The security detection method of claim 1 further comprising,
    performing, by the security detection module, an account validation, in which an anomalous account validation data flow is detected over the time period, and correlating, by the security detection module, at least one of an administrator login activity and a privileged user login activity with the anomalous account validation data flow.

7. The security detection method of claim 1 further comprising,
performing, by the security detection module, an email analysis, in which an email baseline is determined, and
generating, by the security detection module, an email alert when an email address operates inconsistently with an email baseline.

8. A non-rule based security detection system comprising:
a sub-system including a processor, a memory, and a security detection module, wherein the sub-system is communicatively coupled to at least one computing device of a plurality of computing devices, wherein the memory includes a database, wherein each computing device of the plurality of computing devices is associated with at least one data source of a plurality of data sources;
the database receives data from the plurality of data sources;
the security detection module generates a baseline for each data source, wherein the baseline includes a plurality of data source outputs that are evaluated over a time period;
the security detection module detects a plurality of data source anomalies, in which each data source anomaly is associated with at least one data source output exceeding a threshold for the data source baseline;
the security detection module identifying a geolocation for each data source anomaly;
the security detection module generating a plurality of correlations with the plurality of data source anomalies and the geolocation for each data source anomaly; and
the security detection module associating at least one correlation with a security event.

9. The non-rule based security detection system of claim 8 further comprising,
the sub-system receiving a trouble ticket, and
the security detection module associating the trouble ticket with at least one security event.

10. The non-rule based security detection system of claim 8 further comprising,
the security detection module performing a flow analysis, in which a data source baseline is established for at least one data source, and
the security detection module generating an alert when there are changes to the data source baseline.

11. The non-rule based security detection system of claim 8 further comprising,
the security detection module performing a malware analysis, in which an alert is detected that identifies an executable file,
the security detection module identifying an IP address for each computing device of the plurality of computing devices attempting to launch the executable file,
the security detection module correlating a plurality of received emails with the computing device of the plurality of computing devices attempting to launch the executable file.

12. The non-rule based security detection system of claim 8 further comprising,
the security detection module performing a Virtual Private Network (VPN) analysis, in which a VPN connection baseline is established for a plurality of computing devices,
the security detection module identifying an IP address for each computing device,
the security detection module determining a geolocation for each IP address;
the security detection module identifying a failed login attempt based on the geolocation of the computing device that attempted the failed login; and
the security detection module generating an alert when the failed login attempt based on the geolocation of the computing device is inconsistent with the VPN connection baseline.

13. The non-rule based security detection system of claim 8 further comprising,
the security detection module performing an account validation, in which an anomalous account validation data flow is detected over the time period, and
the security detection module correlating at least one of an administrator login activity and a privileged user login activity with the anomalous account validation data flow.

14. The non-rule based security detection system of claim 8 further comprising,
the security detection module performing an email analysis, in which an email baseline is determined, and
the security detection module generating an email alert when an email address operates inconsistently with an email baseline.

15. A non-rule based security detection system comprising:
a sub-system including a processor, a memory, a timeline module, a geolocation module, and a correlation module, wherein the sub-system is communicatively coupled to at least one computing device of a plurality of computing devices, wherein the memory includes a database, wherein each computing device of the plurality of computing devices is associated with at least one data source of a plurality of data sources;
the database receives data from the plurality of data sources;
the timeline module generates a baseline for each data source, wherein the baseline includes a plurality of data source outputs that are evaluated over a time period;
the timeline module configured to detect a plurality of data source anomalies, in which each data source anomaly is associated with at least one data source output exceeding a threshold for the data source baseline;
the geolocation module configured to identify a geolocation for each data source anomaly;
the correlation module configured to generate a plurality of correlations with the plurality of data source anomalies and the geolocation for each data source anomaly; and
the correlation module associating at least one correlation with a security event.

16. The non-rule based security detection system of claim 15 further comprising,
a trouble ticket that is received by the sub-system, and
the trouble ticket being associated with at least one security event.

17. The non-rule based security detection system of claim 15 further comprising a data source baseline corresponding to at least one data source, and the timeline module generating an alert when there are changes to the data source baseline.

18. The non-rule based security detection system of claim 15 further comprising, a malware analysis performed by the sub-system, in which an alert is detected that identifies an executable file, an IP address that is identified by the sub-system for each computing device of the plurality of computing devices attempting to launch the executable file, a plurality of emails received by the sub-system, wherein the sub-system correlates the received emails with the computing device of the plurality of computing devices attempting to launch the executable file.

19. The non-rule based security detection system of claim 15 further comprising, a Virtual Private Network (VPN) analysis based upon at least one VPN connection baseline that is established for a plurality of computing devices, wherein the timeline module performs the VPN analysis, an IP address identified for each computing device, wherein the sub-system identifies the IP address for each computing device, a geolocation determined by the sub-system for each IP address, a failed login attempt identified by the sub-system based on the geolocation of the computing device of the plurality of computing devices that attempted the failed login; and an alert generated by the sub-system when the failed login attempt based on the geolocation of the computing device is inconsistent with the VPN connection baseline.

20. The non-rule based security detection system of claim 15 further comprising, an account validation, in which an anomalous account validation data flow is detected by the sub-system over the time period, and at least one of an administrator login activity and a privileged user login activity correlated with the anomalous account validation data flow.

21. The non-rule based security detection system of claim 15 further comprising, an email analysis, in which an email baseline is determined by the timeline module, and an email alert generated by the sub-system when an email address operates inconsistently with an email baseline.

* * * * *